United States Patent [19]

Kobayashi et al.

[11] Patent Number: 4,766,229

[45] Date of Patent: Aug. 23, 1988

[54] MATERIALS FOR GAS SEPARATION

[75] Inventors: Yoshiteru Kobayashi; Isao Konno, both of Yokohama; Jun-ichi Matsuura, Kamakura, all of Japan

[73] Assignee: Agency of Industrial Science and Technology, Tokyo, Japan

[21] Appl. No.: 819,517

[22] Filed: Jan. 17, 1986

[30] Foreign Application Priority Data

Jan. 18, 1985 [JP] Japan ................................. 60-5833
Jul. 3, 1985 [JP] Japan ................................. 60-144579
Jul. 18, 1985 [JP] Japan ................................. 60-157057

[51] Int. Cl.$^4$ ............................................. C01G 51/00
[52] U.S. Cl. ............................. 556/138; 252/188.28; 252/184; 55/68
[58] Field of Search ............... 252/184, 188.28; 55/68; 556/138

[56] References Cited

U.S. PATENT DOCUMENTS

| 4,022,712 | 5/1977 | Noack | 252/184 |
| 4,451,270 | 5/1984 | Roman | 252/188.28 X |
| 4,542,010 | 9/1985 | Roman et al. | 55/68 X |

FOREIGN PATENT DOCUMENTS 0098707  1/1984  European Pat. Off. ................. 184/

OTHER PUBLICATIONS

Manfrin et al. "Control of the Photochemical Reactivity of Coordination Compounds by Formation of Supramolecular Structures: The Case of the Hexacyanocobaltate (III) Anion Associated with Polyammonium Macrocyclic Receptors." J. Am. Chem. Soc. 1985, 107, 6888-6892.

A. E. Martell et al., Coordination Chemistry Reviews 19, (1976) 1-39.

Polish Journal of Chemistry (formerly Roczniki Chemii), 56, 31 (1982); "Uptake of Molecular Oxygen by Cobalt (II) Chelates with Polyamines in Aqueous Solutions . . .", by Kufelnicki and Petri.

Roczniki Chemii, Ann. Soc. Chim. Polonorum, 51, 1063 (1977); "Uptake of Molecular Oxygen by Cobalt (II) Chelates with Polyamines in Aqueous Solutions . . . ." by Kufelnicki, Petri, and Zwirello.

*Primary Examiner*—John F. Terapane
*Assistant Examiner*—Susan Wolffe
*Attorney, Agent, or Firm*—Oblon, Fisher, Spivak, McClelland & Maier

[57] ABSTRACT

A material for gas separation which consists essentially of (A) a cobalt salt; and (B) amine compound and/or its derivatives containing therein a unit structure to be represented by the following general formula: $+(NHCH_2CH_2CH_2)_n+$ [where: n is an integer of 2 or more], wherein the components (A) and (B) are brought into mutual contact to produce the material for gas separation.

5 Claims, No Drawings

MATERIALS FOR GAS SEPARATION

BACKGROUND OF THE INVENTION

1. Field of the Invention:

The present invention relates to materials for gas separation, and, more particularly, it is concerned with materials for gas separation which are useful for separation of oxygen.

Oxygen is one of those gases which have been used in a wide range of utility and in a large quantity. The fields of its use, which have so far been known, are as follows: welding and cutting of iron and steel material; iron making such as blowing of fuel into blast furnaces, open-hearth furnaces, an converters; refining and smelting of various metals; production of various petrochemical products as the starting materials for the chemical industries; production of cement, refractories, glass, etc. in the ceramic industries; activated sludge treatment of sewage and industrial waste water in ganeral; medical purpose including use of oxygen-enriched air; and so forth. In major industrial countries such as Japan, the quantity of use of oxygen amounts to nine to ten billions cubic meters per annum, the major field of its use being centered on iron and steel manufacturing industry.

2. Description of the Prior Art

The industrialized production of oxygen has been done by the chilling separation method since as far back as the beginning of this century. In case a large amount of oxygen is to be produced in a large scaled industrial plant, this method is considered to be the most appropriate. On the other hand, however, the method requires an extremely large quantity of energy, and, moreover, when oxygen thus produced is to be used at a distant site, it should once be filled in a pressure container for transportation with the consequence that the production cost of oxygen becomes remarkably high. Also, as the method for production of oxygen in a relatively small or medium sized scale, there has recently emerged a method of separating oxygen from air with high concentration in utilization of a difference in the quantity of adsorption of nitrogen and oxygen onto an adsorbing agent such as zeolite, molecular sieve, carbon, and so forth, the method of which is being particularly made use of in various waste water treatment, blowing fuel into various furnaces, medical treatment, and others. This method is also disadvantageous in that it expends high electric power necessary for production of oxygen, hence high production cost. As the other special method, there has been made researches and studies on a method of using metal complexes. It has been known since old that cobalt salt of Schiff base combines with oxygen to form an oxygen complex. In this case, however, the oxygen complex itself becomes decomposed, while it is repeating adsorption and desorption of oxygen with the result that the reaction is disadvantageously difficult to be used as an economical system. Toward the end of 1960's, continued studies and researches on improvement in durability of the oxygen complex were conducted at U.S. Air Force laboratories and other research institutions, as the result of which there were found out relatively durable oxygen complexes such as fluorine substituent called "fluomine". However, the method of using this oxygen complex requires that absorption of oxygen be done at a room temperature or its vicinity, i.e., 27° C. to 38° C., and that its discharge be done at a high temperature, e.g., 82° C., on account of which the temperature increase and decrease are necessary during the separating operation. In an Unexamined Japanese Patent Publication No. 12707/1984 (U.S. patent application No. 393,712; European Patent Application No. 98731), there is disclosed a method of selectively separating oxygen from air, wherein air is caused to pass through an oxygen-complex-containing-solution held on a porous membrane carrier. According to this method, it is possible to continuously separate oxygen in utilization of a pressure difference on both sides of the membrane, while maintaining the temperature constant. In this membrane separation method, a ratio of the permeation rate between oxygen and nitrogen is high, and the permeation rate of oxygen is required to be greater than that of nitrogen, for which the magnitude of the reaction rate between oxygen and the complex, the magnitude of the diffusion coefficient of the resulted oxygen complex, and so forth are considered to be the important factors. However, in spite of the fact that a great many oxygen complexes have so far been discovered, on which studies have been conducted, as seen in Chemical Reviews, Vol. 79, page 139 (1979); Canadian Journal of Chemistry, Vol. 54, page 3424 (1976); Journal of the American Chemical Society, Vol. 102, page 3285 (1980), and others, all these publications having been cited in the above-noted Unexamined Japanese Patent Publication No. 12707/1984, a bulky ligand is required for stable and reversible adsorption and desorption of oxygen with the consequence that molecules of the oxygen complex should eventually be large. With such large molecules of the oxygen complex, it is not possible to expect a sufficiently large diffusion coefficient. On the other hand, there have been conducted studies and researches on various cobalt complexes having the ligand of relatively small molecular weight, although no substance which is able to reversibly absorb and desorb oxygen has been discovered at all upto the present.

SUMMARY OF THE INVENTION

The present inventors conducted strenuous studies and researches with a view to finding out a complex containing relatively small ligand and yet being capable of quickly and reversibly absorbing and desorbing oxygen, as the result of which they found out that a complex obtained by reaction of the following substances possessed capability of reversibly absorbing and desorbing oxygen in spite of its having a relatively small molecular weight:

(A) cobalt salt; and
(B) amine compound or its derivatives, containing therein a unit structure represented by the following general formula: $+NH-CH_2-CH_2-CH_2)_n$ [where: n is an integer of more than 2].

Further, in addition to the above mentioned two components (A) and (B), when carbon dioxide is present as the third component (C), a surprising fact is discovered such that the performance of the material for gas separation improves at a great stride, based on which finding they arrived at the present invention for the material for gas separation having remarkable performance.

It is therefore an object of the present invention to provide a material for gas separation consisting essentially of (A) a cobalt salt and (B) and amine compound or derivatives thereof containing therein a unit structure represented by the following general formula: $+NH-CH_2-CH_2-CH_2)_n$ [where: n is an integer of more than 2], these components being brought into mutual contact to result in the material for gas separation.

It is another object of the present invention to provide a material for gas separation consisting essentially of the above mentioned components (A) and (B), to which carbon dioxide is added as the third component (C), these three components being brought into contact among them to form the material for gas separation.

It is still another object of the present invention to provide a material for gas separation which is obtained by bringing the components (A) and (B) or the components (A), (B) and (C) into contact among them in the presence of an axial base.

It is other object of the present invention to provide a material for gas separation which is obtained by bringing the components (A) and (B) or the components (A), (B) and (C) into contact among them in the presence of a non-aqueous solvent.

It is still other object of the present invention to provide a selective gas absorbing liquid containing therein such material for gas separation as well as a selective gas permeating membrane containing therein such material for gas separation.

The foregoing objects, other objects as well as specific ingredients to be used for preparation of the material for gas separation according to the present invention will become more readily apparent and understandable from consideration of the following detailed description thereof, when read in conjunction with several preferred examples.

DETAILED DESCRIPTION OF THE PREFERRED EMBODIMENTS

In the following, the present invention will be described in detail.

As the cobalt salt of the above mentioned component (A), there may be used any kind of compounds which form complexes with amine compounds containing therein a unit structure to be represented by the following general formula: $-(NH-CH_2-CH_2-CH_2)_n-$ [where: n is an integer of 2 or more], or with those derivatives of the amine compounds, or with various sorts of axial base and/or solvent to be further added thereto. More concretely, the following cobalt compounds are exemplified: cobalt oxide; cobalt hydroxide; cobalt halides such as cobalt fluoride, cobalt chloride, cobalt bromide, cobalt iodide, etc., and their hydrates; salts of inorganic and organic acids such as cobalt sulfate, cobalt nitrate, cobalt carbonate, cobalt cyanate, cobalt thiocyanate, cobalt perchlorate, cobalt periodate, cobalt tetrafluoroborate, cobalt oxalate, cobalt tartarate, cobalt acetate, and so forth; hydrates of these inorganic and organic acid salts; complex salts such as cobalt alum, etc.; and organic cobalt compounds such as cobaltocene, etc. These cobalt compounds may have arbitrary atomic valence.

Of the above-enumerated cobalt salts, those divalent cobalt salts are preferable, or, more particularly, those divalent inorganic cobalt salts are preferable. Examples of the most preferable cobalt salts are $Co(SCN)_2$, $CoF_2$, $CoBr_2$, $CoI_2$ and $Co(ClO_4)_2$.

Next, as the amine compounds of the above mentioned component (B), there may be included all those substances containing in their molecules the chemical structure of amine compounds containing therein a unit structure to be represented by the following general formula: $-(NH-CH_2-CH_2-CH_2)_n-$ [where: n is an integer of 2 or more] and their derivatives. The range of the integer n may be from 2 to 100,000, or preferably from 2 to 10,000, or most preferably from 2 to 1,000. Examples of such compounds, i.e., those compounds containing therein the above mentioned amine compound represented by $X-(NH-CH_2-CH_2-CH_2)_n-Y$, wherein, for example, X represents hydrogen atom and Y denotes the amino group having the amino group at both ends of the molecule to be represented by the amino group, though both X and Y are not particularly limitative, are: N,N'-bis(3-aminopropyl)methylamine, N,N'-bis(3-aminopropyl)phenylamine, dipropylenetriamine, tripropylenetetramine, tetrapropylenepentamine, pentapropylenehexamine, hexapropyleneheptamine, oligopropyleneimine, polypropyleneimine, and so forth.

As those compounds having the unit structure, wherein X is hydrogen atom and Y is other than amino group, there may be exemplified those compounds having the functional groups such as $-COO^-$, $-CRO$, $$-\overset{|}{C}=O,$$

$-O^-$, $-OR$, $-CSS^-$, $CRS$, $$-\overset{|}{C}=S,$$

$-S^-$, $-SR$, $-CONHR$, $-NHCOR$, $-CN$, $-CH=N-$, $-C=N-$, $-NH-$, $-NR-$, $-NR_2$ and so on (where: R is hydrogen and organic group). Concrete examples of these compounds are as follows:

$H-(NH-CH_2-CH_2-CH_2)_n-OH$
$H-(NH-CH_2-CH_2-CH_2)_n-NHR$
$H-(NH-CH_2-CH_2-CH_2)_n-N(CH_3)_2$
$H-(NH-CH_2-CH_2-CH_2)_n-NHCO-C_{17}H_{35}$ and so forth.

Further, when n is an integer of 3 or more, the functional group of $-F$, $-Cl$, $-Br$, $-I$, and $-R$ (where: R denotes an organic group) are exemplified for Y, besides those as mentioned above. Concrete examples of such compounds are as follows:

$H-(NH-CH_2-CH_2-CH_2)_n-NHCH_2-CH_2CH_2F$
$H-(NH-CH_2-CH_2-CH_2)_n-NHCH_2CH_2CH_2OH$
$H-(NH-CH_2-CH_2-CH_2)_n-NHCH_2CH_2-CH_2CH_3$
$H-(NH-CH_2-CH_2-CH_2)_n-NH-CH_2CH_2-CH_2-$ (polystyrene)
and so forth.

Even when X represents the organic group, Y may also denote the same functional group as mentioned above. Concrete examples of such compounds are as follows:

$CH_3-(NH-CH_2-CH_2-CH_2)_2-NH_2$
$(polyethylene)-[(NH-CH_2-CH_2-CH_2)_3NH_2]_3$
$(polyurethane)-[(NH-CH_2-CH_2-CH_2)_3NH_2]_{10}$
$CH_3-(NH-CH_2-CH_2-CH_2)_2-NH_2$
$C_6H_5-(NH-CH_2-CH_2-CH_2)_2-NH_2$
$C_3H_7-(NH-CH_2-CH_2-CH_2)_2-NH(CH_3)$
$CH_3-(NH-CH_2-CH_2-CH_2)_2-NH(CH_3)_2$
$C_{17}H_{33}-(NH-CH_2-CH_2-CH_2)_2-NH(CH_3)$
$C_{15}H_{31}-(NH-CH_2-CH_2-CH_2)_2-NH-C_{15}H_{31}$
$(polystyrene)-[(NH-CH_2CH_2CH_2)_3NH_2]_{50}$
$(polyurethane-(NH-CH_2-CH_2-CH_2)_4NH$ polyurethane),
and so forth.

Further, when the integer n is more than 3, Y may represents —F, —Cl, —Br, —I and —R (where: R is an organic group), as examples. Concrete examples of such compounds are as follows.

CH$_3$-(NH—CH$_2$—CH$_2$—CH$_2$)$_3$F,
CH$_3$-(NH—CH$_2$—CH$_2$—CH$_2$)$_3$CH$_3$,
CH$_3$-(NH—CH$_2$—CH$_2$—CH$_2$)$_3$CH=CH$_2$, and so forth.

Furthermore, cyclic amines to be represented by the following general formulae may also be included:

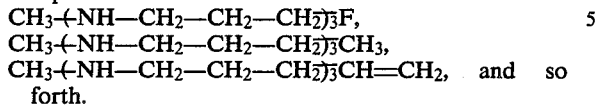

[where: R denotes the organic group and bi-functional group such as CO, NR', S, O, etc., and concrete examples of such compounds are as follows:

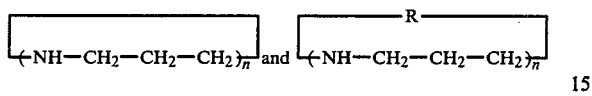

In the following, further explanations will be given as to the derivatives of the amine compounds containing therein the unit structure to be represented by the abovementioned general formula: -(NH—CH$_2$—CH$_2$—CH$_2$)$_n$ [where: n is an integer of 2 or more].

The derivative as referred to herein is meant by those compounds obtained by chemically bonding all or a part of hydrogen (H) in the general formula -(NH—CH$_2$—CH$_2$—CH$_2$)$_n$ with other atoms, functional groups, oligomers, polymers, or else.

More specifically, such derivative is meant not only by those compounds containing therein the repetitive unit structure of a substituent substance such as, for example,

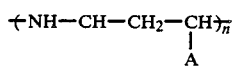

[where: A denotes a functional group, etc. substituted for hydrogen (H)], but also by the following compounds:

[in case of n = 2]

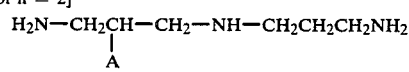

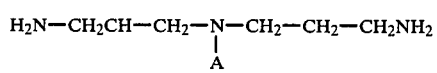

H$_2$N—CH$_2$CHCH$_2$—NH—CH$_2$CH$_2$CH$_2$NHA

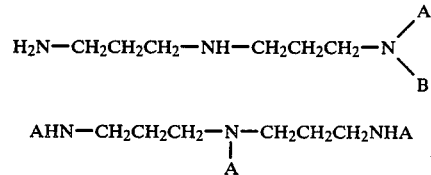

AHN—CH$_2$CH$_2$CH$_2$—N—CH$_2$CH$_2$CH$_2$NHA
                    |
                    A

[where: A and B are the functional groups substituted for hydrogen (H)];

[in case of n = 3]

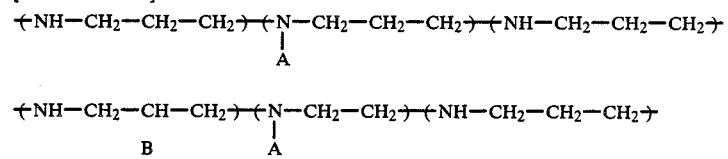

[where: A and B are the functional group, etc. substituted for hydrogen (H)]; wherein the structure is such that at least one of hydrogen atoms in the three repeating unit structures is substituted. It should be noted that, in the foregoing explanations, those examples where the integer n is 2 or 3 are presented, but the same applies to a case where the integer n is 4 or more.

Furthermore, those cyclic substances wherein the substituted two functional groups, oligomers, polymers, etc. are mutually bonded at the other end of the molecule may also be included in the derivatives of the amine compound. As the compounds of such structure, there may be exemplified those containing therein a unit structure to be represented by the following general formula:

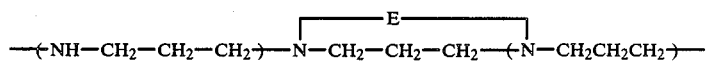

[where: E denotes the functional group, etc. substituted for hydrogen (H)].

In substitution of -(NH—CH$_2$—CH$_2$—CH$_2$)$_n$ [where: n is an integer of 2 or more], there is no limitation to the number of the substituent group bond.

For the functional groups, oligomers, and polymers to substitute hydrogen (H) in the above-described general formulae, there may be exemplified the following.

As the functional group, the following are enumerated: halogens such as F, Cl, Br, and I, carboxylic group or its metal salts (—COOH, —COOM), sulfonyl group (—SO$_3$H), sulfynyl group (—SO$_2$H), acid anhydride (—CO—O—CO—), oxycarbonyl group (—COOR), haloformyl group (—COX), carbamoyl group (—CONH$_2$), hydrazinocarbonyl group (—CONHNH$_2$), imido group (—CO—NH—CO—), amidino group

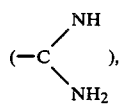

nitrile group (—CN), isocyano group (—NC), formyl group (—CHO)

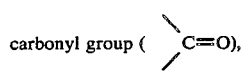

hydroxy group (—OH), alkoxy group (—OR), phenoxy group

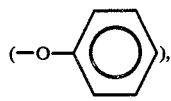

mercapto group (—SH), hydroperoxy group (—O—OH), amino group (—NH$_2$), imino group (=NH), hydrazino group (—NHNH$_2$), sulfide group (SR), peroxy group (—O—O—R), diazo group (=N$_2$), azido group (—N$_3$), nitroso group (—NO), nitro group (—NO$_2$) and organic groups.

The organic groups as herein referred to include all the groups for the organic compounds and the organometallic compounds, which are ordinarily conceivable, and there is no particular limitation thereto. Examples of such organic groups are: saturated aliphatic hydrocarbon groups in the form of straight chain or branched chain such as methyl group, ethyl group, propyl group, butyl group, pentyl group, hexyl group, heptyl group, octyl group, nonyl group, decyl group, undecyl group, dodecy group, tridecyl group, tetradecyl group, pentadecyl group, hexadecyl group, heptadecyl group, octadecyl group, nonadecyl group, and so forth; unsaturated aliphatic hydrocarbon group such as ethynyl group, aryl group, vinyl group, and so forth; saturated alicyclic hydrocarbon groups such as cyclopropyl, cyclobutyl, cyclopentyl, cyclohexyl, cycloheptyl, cyclooctyl, cyclodecyl, and so forth; unsaturated alicyclic hydrocarbon groups such as fulvene, annlene, and so on; aromatic hydrocarbon groups such as phenyl, tolyl, cumyl, styryl, xylyl, cinnamyl, mesityl, and so forth; condensated polycyclic hydrocarbon groups such as indene, naphthalene, azulene, and so forth; heterocyclic compounds such as 1-pyrrolidinyl, 3-isooxazolyl, 3-morpholyl, 2-furyl, 2-pyridyl, 2-quinolyl, 4-piperidyl, imidazolyl, pyrazolyl, triazolyl, tetrazolyl, piperidino, morpholino, furfuryl, 2-thenyl, pyrryl, thiazolyl, and so forth; aliphatic hydrocarbon group containing therein the aromatic ring such as benzyl, etc.; derivatives of these various kinds of hydrocarbon groups; those functional groups containing therein silicon such as trimethyl silyl, etc. or the above mentioned organic groups having the functional groups containing therein silicon; those functional groups containing therein fluorine such as perfluoromethyl, perfluoroethyl, and so forth or the above mentioned organic groups having the functional group containing therein fluorine.

In substituting hydrogen (H), it may be replaced by the molecules of oligomers or the molecules of polymers. The compounds may be expressed in such a manner that one or more unit structures represented by the following general formula: $\text{-(NH—CH}_2\text{—CH}_2\text{—CH}_2\text{)}_n\text{-}$ [where: n is an integer of 2 or more] is bonded with the molecule of oligomer or the molecule of polymer, in the form, in which hydrogen (H) is substituted. Such compounds have the following structure, for example.

[in case of n = 2]
H$_2$N—CH$_2$—CH$_2$—CH$_2$—NH—CH$_2$—CH$_2$—CH$_2$—oligomer (or polymer), H$_2$N—CH$_2$—CH$_2$—CH$_2$—N—CH$_2$—CH$_2$—CH$_2$—NH$_2$
|
oligomer (or polymer)

H$_2$N—CH$_2$—CH—CH$_2$—NH—CH$_2$CH$_2$CH$_2$—NH$_2$
|
oligomer (or polymer)

(H$_2$N—CH$_2$CH$_2$CH$_2$NH—CH$_2$CH$_2$CH$_2$—NH)$_m$—polymer

[where: m is n integer of 2 or more].

[in case of n = 3]
(NH—CH$_2$—CH$_2$—CH$_2$)—(N—CH$_2$CH$_2$CH$_2$)—(NH—CH$_2$CH$_2$CH$_2$),
|
oligomer (NH—CH—CH$_2$—CH$_2$)—(NH—CH$_2$—CH$_2$—CH$_2$)—(NH—CH$_2$—CH$_2$—CH$_2$).
|
polymer The same can be applied to the compounds containing the unit structure, in which the integer n is 4 or more.

As the oligomers to be used for the present invention, there may be exemplified the following: those having a molecular weight in a range of from 100 to 30,000 such as α-olefin, polyhydric alcohols, polyethylene glycol, crown ether, polysulfide, polyethyleneimine, fluorine-containing oligomer, low molecular weight polyethylene, low molecular weight polypropylene, polypropylene glycol, polyglycerine, oligo-ester acrylate, sodium polyacrylate, adiponitrile, low molecular weight polybutene, polyisobutylene, cyclododecatriene, liquid polybutadiene, liquid chloroprene, liquid polypentadiene, synthesized terpenoid, low molecular weight polystyrene, petroleum resin, castor oil, silicone type oligomers, polyester oligomers, polyamide oligomers, polyisocyanate oligomers, phenol resin, amino resin, xylylene resin, ketone resin, oligopeptide, lipid, and so forth.

As the polymer to be used for the present invention, there may be exemplified those having a molecular weight in a range of from 1,000 to 1,000,000 such as, though not limitative, natural rubber, neoprene, polybutadiene, polybutyrene, polyisoprene, polybutene, polyethylene, polyisobutylene, poly-4-methyl-pentene-1, polypropylene, polyacrylic acid, polybutyl acrylate, polyethyl acrylate, polyisobutyl acrylate, polymethyl acrylate, polysodium acrylate, polyacryl amide, polybutyl methacrylate, polyethyl methacrylate, polymethyl methacrylate, polymethacrylic acid, polysodium methacrylate, polytrimethylsilyl methacrylate, polymethacrylic amide, polyvinyl ether, polyvinyl thioether, polyvinyl alcohol, polyvinyl ketone, polyvinyl chloride, polyvinylidene chloride, polydifluoroethylene polytrifluoroethylene, polymethacrylonitrile, polyvinyl fluoride, polyvinylidene fluoride, polyvinyl ester, polyvinyl acetate, polyvinyl formate, polystyrene, poly-α-methylstyrene, polydivinyl benzene, polyvinyl carbazole, polyvinyl pyridine, polyvinyl pyrrolidone, polyphenylene, polyphenylene oxide, polyoxymethylene, polycarbonate, polyethylene adipate, polyethylene terephthalate, polyester, polyurethane, polysulfone, polyamideimide, polysiloxane, polysulfide, polythioether, polysulfone amide, polyamide, polyimide, polyurea, polyphosphagen, polysilane, polysilazane, polyfuran, polybenzoxazole, polyoxathiazole, polybenzothiazole, polypyromellitimide, polyquinoxaline, polybenzimidazole, polyoxoisoindoline, polyoxoindoline, polytriazine, polypiperazine, polypyridine, polypiperidine, polypyrazole, polypyrrolidine, polycarborane, polybicyclononane, polydibenzofurane, polyacetal, acetylene type polymers; random copolymers, graft copolymers, and block copolymers of these polymers and their chemically modified polymers; inorganic homopolymers such as boron-containing polymer, silicon-containing polymer, germanium-containing polymer, nitrogen-containing polymer oxygen-containing polymer, sulfur-containing polymer, selenium-containing polymer, phosphorus-containing polymer, and so forth; inorganic hetero-polymers such as hydrogenated berylium polymer, hydrogenated magnesium polymer, hydrogenated boron polymer, hydrogenated aluminum polymer, hydrogenated gallium polymer, hydrogenated indium polymer, boron nitride polymer, aluminum nitride polymer, silicon nitride polymer, silicon polymer, phosphorus nitride polymer, phosphoric acid polymer, phosphor-containing polymer, sulfur nitride polymer, and others; organic derivatives of these inorganic high polymers; various sorts of coordinated high polymers; various sorts of organo-metallic polymers; inorganic polymers such as carborane polymer, ionic polymer, polyionic complex, silicate, phosphate, inorganic glass, activated carbon, molecular sieves, ceramics, carbon polymers, silicon carbide polymers, and others; homoglucans such as cellulose, starch, brulan, glycogen, dextran, mannan, galactan, fructan, laminaran, lichenan, nigeran, pentosan, and so forth; heteroglucans such as glucomanno glucan, galactomanno glucan, arabino galacto glucan, arabinoxylo glucan, vegetable rubber, algal polysaccharides, and so on; polyuronides such as pectin, alginic acid, bacterial polysaccharides, and so forth; uropolysaccharides such as hyaluronic acid, teichomic acid, coromic acid, chondroitin sulfuric acid, dermatan sulfuric acid, heparin, heparin sulfuric acid, keratin sulfuric acid, chitin, blood group polysaccharides, and so forth; derivatives of the above-listed polysaccharides such as ethyl cellulose, carboxymethyl cellulose, acetyl cellulose, triacetate, ethyl amylose, and so on; polyamino acid and its derivatives; polypeptide and its derivatives; lipid and its derivatives; cephalose, ion-exchange resin hydrogel, protein and their derivatives; and nucleic acid and its derivatives.

At the time of reaction between the above mentioned cobalt salt and the amine compound or its derivatives, such reaction may further be carried out in the presence of the axial base; or the axial base may be added to the reaction product, whereby the oxygen separating capability of the resulting materials for gas separation can be improved much more.

This axial base does not necessarily means that the coordinating direction in the complex as the reaction product according to the present invention is in the axial direction. This may include the Lewis base such as imidazole, ketone, amine, amide, ester, lactone, sulfoxide, pyridine, and so on, as disclosed, for example, in the Unexamined Japanese Patent Publication No. 12707/1984. Concrete examples of such compounds are: imidazoles such as 1-methylimidazole, 2-methylimidazole, 1,2-dimethyl imidazole, benzoimidazole, and so on; pyridines such as 4-dimethyl aminopyridine, 4-aminopyridine, 4,4'-bipyridine, 4-methoxypyridine, 4-methylamino pyridine, 3,4-lutidine, pyridine, 4-methylpyridine, 4-cyanopyridine, pyradine, 4-pyrrolidinopyridine, N-methylpyrazinium halide, picoline, and so forth; lactones such as γ-butyrolactone, etc.; esters such as ethylbenzoate, ethylacetate, and so forth; amides such as dimethylacetamide, etc.; and phosphoricamides such as hexamethylphosphoricamide, etc. Of these compounds, there may be preferably used 1-methylimidazole, 2-methylimidazole, 4-dimethylaminopyridine, γ-butyrolactone, and ethylbezoate. It is also feasible to use those substances as the axial base, in which the above-listed compounds are bonded with polymers or oligomers.

As mentioned in the foregoing, the reaction between the cobalt salt and the amino compound containing therein the unit structure represented by the following general formula: $-(NH-CH_2-CH_2-CH_2)_n-$ [where; n is an interger of 2 or more] is carried out in either presence or absence of the axial base, or by causing these two materials to react in advance, after which the axial base is added to the reaction product to continue further reaction. Although a solvent is not always required at the time of the reaction, the following compounds are recommended for use as the solvent, if and when it is to be used: gamma-butyrolactone, dimethyl sulfoxide, propylene carbonate, diethyl sulfoxide, N-methyl pyrrolidone, dimethyl acetamide, gamma-valerolactone, dimethylformamide, formamide, ε-caprolactone, tributyl phosphate, diethyleneglycol dimethylether, benzonitrile, and so forth. It is also feasible to use the above mentioned axial bases as the solvent. It should however be noted that the solvent is not limited to those as listed above.

Each of the above mentioned cobalt salt, amine compound or its derivative, axial base, and solvent may be used singly or in mixture of two or more kinds of them.

Furthermore, it is possible also to use these materials in mixture with other compounds outside the range of the above definition.

Although no particular limitation is imposed on the ratio of the amine compound or its derivative to the cobalt salt at the time of their reaction, the molar ratio of the amine compound to the cobalt salt is preferably at least 0.01, more preferably from 0.1 to 1,000, optimumly from 0.5 to 20. Accordingly, it goes without saying that, even if diluted with amine compounds other than those according to the present invention, the reaction product may fall within the scope of the present invention, so long as the above mentioned conditions are satisfied.

While no particular limitation is imposed on the ratio of the axial base to the cobalt salt, the molar ratio of the axial base to the cobalt salt is preferably at least 0.001, more preferably from 0.01 to 1,000, most preferably from 0.1 to 50.

On the other hand, although the solvent is not necessarily used, it is efficacious in improving the performance of the resulting separator, in which case use of the solvent is preferred at a ratio (by mole) of <10,000 of the solvent to the cobalt salt. In this case, its ratio to the amine compound and the axial base may be selected in the same manner as mentioned in the foregoing.

There is no particular sequence of adding the cobalt salt, the amine compound, and the axial base, when they are to be reacted either in the presence or absence of the solvent. While the axial base may, or may not, be added, it helps increase, when added, the oxygen separating performance of the separator to be obtained, hence addition of such axial base is desirable.

Although no particular limitation is imposed on the reaction temperature and the pressure, the reaction should preferably be carried out at a temperature of from 0° C. to 200° C. and under a pressure of from 0.01 to 100 kg/cm$^2$. Prior to the reaction, it is desirable to carry out the pre-treatment of the starting materials such as heat-treatment, reduced pressure treatment, and so forth, and the refining such as dehydration, deoxidation, etc. Further, it is possible to change the reaction conditions such as the temperature, the pressure, etc., during the reaction. Although there is no limitation to the reaction time, it may usually range from 0.1 to 100 hours, or more desirably from 0.5 to 10 hours.

In the production of the material for gas separation, various methods may be adopted without limitation for bringing carbon dioxide into contact with the cobalt salt and the amine compound, or, depending on the cases, with the axial base and/or non-aqueous solvent. Examples of such methods are: (1) a method, in which the cobalt salt, the amine compound, the axial base and the non-aqueous solvent are added in any arbitrary sequence, and then they are mutually brought into contact for reaction in the presence of carbon dioxide; (2) a method, in which the cobalt salt, the amine compound, the axial base, and the non-aqueous solvent are brought into contact for reaction in any arbitrary sequence, after which carbon dioxide is added to the reaction product to cause carbon dioxide to contact with the reaction product; (3) a method, in which carbon dioxide is introduced into the reaction system on the way of bringing the cobalt salt, the amine compound, the axial base and the non-aqueous solvent into contact in any arbitrary sequence; (4) a method, in which carbon dioxide is introduced at the stage of separating a gas using the material for gas separation obtained by contacting the cobalt salt, the amine compound, the axial base, and the non-aqueous solvent, as the selective gas permeating membrane or the selective gas absorbing agent; or (5) a method, in which, at the stage of separating the above mentioned gas, carbon dioxide is introduced into a gas to be supplied for the gas separation by being mixed with it (in the case of a gas containing therein carbon dioxide primarily, intentional addition of carbon dioxide is not necessary); and various others.

Instead of using carbon dioxide in the form of gas, liquid or solid, it is possible to use those compounds such as various sorts of metal carbonate and various sorts of peroxydicarbonate, which produce carbon dioxide under certain conditions. Further, there may also be put into practice a method, in which, at the stage of production of the material for gas separation or at the stage of separating the gas using the material for gas separation, the operating conditions are so established that carbon dioxide tends to be readily produced, besides the above mentioned addition of the compound which readily produces carbon dioxide; or a method, in which other additives are added to the reaction system, or such additives are used for the carrier base of the gas separator so as to facilitate production of carbon dioxide; or other methods. There is no particular limitation to the concentration of carbon dioxide to be used at the time of production of the material for gas separation according to the present invention or at the time of separating a gas using such material for gas separation. However, a preferable range of its concentration is from 1 ppm to 1,000,000 ppm, or more preferable range is from 10 ppm to 1,000,000 ppm, or the optimum range thereof is from 100 ppm to 1,000,000 ppm.

When the material for gas separation according to the present invention is used in its liquid form, the reaction product obtained by reaction of the cobalt salt, the amine compound, the axial base, and the non-aqueous solvent may be used as it is, or such reaction production is extracted as a solid content by the reduced pressure method, deposition method, etc., after which such solid product may be dissolved again into a solvent which is capable of dissolving the solid reaction product.

In the following, explanations will be given as to the method for selectively separating a particular gas, specifically oxygen, by use of the material for gas separation obtained by the reaction of the cobalt salt, the amine compound, and the axial base according to the present invention.

In the first place, explanations will be given as to the selective gas permeation membrane containing therein the material for gas separation according to the present invention. As the method of using the material for gas separation according to the present invention in the form of the selective gas permeation membrane, there may be contemplated various methods such as, (1) a method, in which the material for gas separation (hereinafter simply called "separator") is bonded to the support membrane which has been formed into a membrane; (2) a method, in which the separator combined with a polymer or an oligomer is processed into a membrane singly or in mixture with other polymer; (3) a method, in which the separator is processed singly or in combination with other molecules into a monomolecular membrane, a bimolecular membrane, a multilayer membrane, an interlayer membrane, and so forth; and (4) a method, in which the separator itself or in liquid is impregnated or held in a porous membrane, an anisotropic membrane, or a composite membrane.

When the solid membrane separator is combined with a separate membrane, or the liquid separator is processed into a membrane singly or in mixture with other polymer, there is no particular limitation to the kinds of material for the membrane to be used as the base or support to hold thereon the above mentioned monomolecular membrane, etc. and as the carrier to hold therein the above mentioned liquid membrane. As the material for the membrane, there may be enumerated organic high polymers such as regenerated cellulose, cellulose ester, polycarbonate, polyester, teflon, nylon, acetylcellulose, polyacrylonitrile, polyvinyl alcohol, polymethyl methacrylate, polysulfone, polyethylene, polypropylene, polyvinyl pyridine, polyphenylene oxide, polyphenylene oxide sulfonic acid, polybenzimidazole, polyimidazopyrrolone, polypiperazine amide, polystyrene, polyamino acid, polyurethane, a copolymer of polyamino acid and polyurethane, polysiloxane, a copolymer of polysiloxane and polycarbonate, polytrimethylvinyl silane, collagen, polyion complex, polyurea, polyamide, polyimide, polyamideimide, polyvinyl chloride, sulfonated polyfurfuryl alcohol, and so forth; and inorganic substances such as glass, alumina, silica, silica alumina, carbon, metals, and so on.

The shape of the support may be planar, tubular, spiral or hollow, any of these shapes being adequately used for the purpose of the present invention. The support may be porous in its entirety, or may be in the form of an anisotropic membrane having a high density layer on its surface part alone, or may be a uniform membrane. Further, the support may have on its surface a thin layer of other material coated thereon by means of, for example, vapor deposition, coating, polymerization, plasma polymerization, or others. The total thickness of the thin layer is not particularly limited, but it should preferably be in a range of from 10 to 1,000 microns. Such support may also be used by laminating it on another support of a different material.

Now explaining the current situation in general about the separation membrane, there has heretofore been known various kinds of high polymer membranes as the separation membrane for gas mixtures; however, since these membranes have relatively small permeation coefficient of the gas, materials of high permeation coefficient have been desired. When the membrane is in liquid form, the solubility coefficient and the diffusion coefficient of gas are large with the consequence that the permeability coefficient thereof can be made large. Further, when a substance having a selective and reversible interaction with a certain gas alone is contained in such liquid separation membrane, the permeability of the gas can be further increased. On the other hand, since selectivity of the membrane is given by a difference in the solubility among the gases into the membrane and a difference in the diffusion speed among the gases within the membrane, if and when the membrane contains in it such substance as mentioned above having a selective and reversible interaction with a particular gas alone, the solubility of the particular gas alone becomes large, hence the selecting performance of such membrane can be augmented at a great stride.

Of course, the selective separating performance of the membrane increases, even when a substance having the selectively reversible interaction with a certain particular gas alone is contained in the surface as well as in the interior of the solid membrane. Generally speaking, however, the selective separating performance of the membrane improves much more, if and when the substance having the selectively reversible interaction with such certain gas alone is contained in the liquid membrane.

There have been many examples about such membrane containing therein the substance having the selectively reversible interaction with such certain gas alone: for example, separation of carbon dioxide by an aqueous solution of bicarbonate of alkali metal (cf. Japanese Patent Publication No. 1176/1970); separation of olefin with an aqueous solution silver nitrate (cf. Japanese Patent Publication No. 31842/1978); separation of nitrogen monoxide with formamide solution of ferrous chloride (cf. A. I. Ch. E. Journal, Vol. 16, No. 3, page 405 (1970)); separation of oxygen with a solution of the cobalt complex containing the Schiff base, etc. as the ligand (cf. Unexamined Japanese Patent Publication No. 12707/1984). These liquid membranes are used by being held in a membrane to be the supporter or carrier.

In the present invention, the method for impregnating the material for gas separation into the selective gas permeating membrane is not particularly limited, but, when it is used in the form of the liquid membrane, the above mentioned material for gas separation or its solution is used in contact with, or held on, the membrane to be used as the support. Thickness of the layer of the material for gas separation or its solution may be a few angstroms or greater, though it is not so limitative. However, when the liquid membrane of the reaction product is used in its state of not being stirred, the thickness should preferably be as thin as possible for attaining a high permeation rate. When the membrane is too thin, the permeation rate of other gases not intended for separation becomes also high with the consequence that the separability of these gases lowers unfavorably. While the optimum membrane thickness depends on the velocity constant, equilibrium constant and other conditions for the combination and dissociation between the gas and these reaction products, it may range approximately from 0.01 to 50,000 microns, or more preferably from 0.1 to 10,000 microns thick. In the event that the liquid membrane is used under stirring, no problem occurs, even when its thickness is increased, although the sustantial membrane thickness existing on the surface of the support membrane as the diffusion layer should preferably be as same as the membrane thickness when the liquid membrane is not agitated.

There may be contemplated various methods for separating gas using the membrane, wherein the material for gas separation or its solution is held on the support or carrier. In any of these methods, however, the membrane is used with a partial pressure difference of the gas for separation being given on both surfaces of the membrane, as is the case with separation of the gas by means of an ordinary polymer film.

Furthermore, it is also possible to utilize a method, in which a vessel containing therein the material for gas separation according to the present invention or its solution is provided, apart from the membrane cell, from which the liquid is led to the surface of the support membrane (the primary side of the membrane) for the membrane cell by means of a pump for circulation. In this case, it is also possible to adopt a method for continuously taking out oxygen with high selectivity by the successive operations of sufficiently absorbing oxygen, for example, into the liquid in the storage vessel, then continuously dissociating and desorbing the gas which was dissolved or combined by reducing pressure at the secondary side of the membrane in the membrane cell, followed by leading the oxygen to the secondary side of the membrane, thereafter sending the liquid which has been deprived of oxygen back into the storage vessel, and again dissolving oxygen. In this case, it is possible to facilitate taking out of oxygen by differentiating the temperature between the membrane cell and the storage vessel. Although there is no particular limitation to the temperature at the membrane cell portion, it may range, for example, from 0° C. to 200° C.

In the next place, explanations will be given as to the selective gas absorbing agent containing therein the material for gas separation according to the present invention. As the method of using the material for gas separation in the form of the selective gas absorbing agent, there may be contemplated various methods such as one, in which the separator of the present invention is carried on a porous carrier such as organic polymer, inorganic substance, and so on; one, in which the liquid separator is used singly or in the form of its solution; and others. When the separator is to be carried on the porous carrier of the organic polymer or the inorganic substance, the materials to be used as such carrier or support may be the above mentioned materials which have been exemplified as the materials useful for the support membrane to hold thereon the above mentioned polymer or the separator, as has been indicated as the example in the explanation of the derivatives of the amine compound; they may be exemplified equally as the material for the carrier usable as it is. Further, when the separator according to this invention is used in the form of absorbing liquid, such liquid separator can be used in its simple form or in the form of solution prepared by dissolving the separator into a solvent. In this case, the solvent may be the same as those used in the production of the separator according to the present invention, or may be totally different kinds of solvent. It is noted that oxygen selectively dissolves into the solution of the separator according to the present invention in a much more quantity than other gases. In this case, there is no particular limitation to the pressure of a mixed gas containing therein oxygen and to be in contact with the solution of the separator, and a partial pressure of oxygen as well. Usually, however, the pressure of the mixed gas in use ranges from 0.1 to 100 kg/cm$^2$ and the partial pressure of oxygen ranges from 0.01 to 10 kg/cm$^2$. It can be said that the higher the partial pressure of oxygen to be in contact with the solution of the separator according to the present invention is, the higher becomes the absorbing rate of oxygen, which is advantageous. While a low temperature contributes much to the absorbing quantity of oxygen, the oxygen absorption is usually carried out at a temperature in a range of from $-50°$ C. to $100°$ C. The other method of increasing the absorbing rate of oxygen is to broaden the area of the interface between the gas and the liquid, which may desirably be carried out by gas bubbling in the separator solution or by stirring the solution. Following this oxygen absorption, when the separator solution, into which oxygen has been selectively absorbed at a higher ratio, is subjected to pressure reduction, there is discharged from the separator solution the oxygen-rich gas. There is no particular limitation to the pressure and the temperature in this discharge operation, but it is usually carried out at a pressure ranging from 0 to 1 kg/cm$^2$ and at a temperature of from $-50°$ C. to $100°$ C. The lower the pressure is and the higher the temperature is, the more becomes the discharge quantity of oxygen, which is advantageous. In this case, too, the contact and separation of the mixed gas to and from the separator solution under its stirring may advantageously increase the gas desorbing rate.

There is no particular limitation to the device when the material for gas separation according to the present invention is used as the selective gas permeating membrane. As practicable examples, there may be adopted the following two expedients. First, a membrane holding thereon the separator is equipped on a module, in which an inlet port and a purging port for the feed gas are provided at the primary side of the membrane, while an outlet port for the produced gas current is provided at the secondary side of the membrane; then a vacuum pump is installed at the outlet port for the produced gas current so as to take out the produced gas current which has passed through the membrane under a reduced pressure; depending on necessity, a pressure regulator and a flow meter are connected with the module.

By use of such device, a gas (for example, air) is fed into primary side of the membrane, through which oxygen is mainly caused to permeate, thereby taking out nitrogen-rich air from the primary side of the membrane and the concentrated oxygen gas from the secondary side of the membrane. The nitrogen-rich air or the concentrated oxygen gas may be sent back again to the gas feeding side to be circulated for further use. Secondly, as another method, the separator or its solution, into which the feed gas has been dissolved, is supplied into the primary side of the membrane, instead of supplying the feed gas alone thereinto, and then the concentrated oxygen gas is taken out of the secondary side of the membrane, while the liquid of the separator with a reduced quantity of oxygen dissolved thereinto is taken out of the purging port at the primary side of the membrane. In the meantime, the liquid of the separator with the reduced quantity of the dissolved oxygen is returned to the feeding tank where sufficient amount of air, etc. is absorbed, and then the feed gas is supplied again into the membrane module. It is, of course, possible that, instead of taking out the permeated gas by discharging the secondary side of the membrane by the vacuum pump, a different kind of gas capable of separating from oxygen is supplied to the secondary side of the membrane at a later time, while operating the device in a state of the partial pressure of oxygen in the permeated gas being lower than that of oxygen at the feeding side.

In case the material for gas separation according to the present invention is used as an absorbing agent by its being carried on a porous solid member, the separator is filled in a column, etc. In this instance, the oxygen-containing feed gas is introduced from the gas feeding port of the column to principally absorb oxygen, and the gas with reduced quantity of oxygen is discharged from the purging port. Subsequently, the interior of the column is subjected to pressure-reduction to desorb oxygen from the separator and to take out the concentrated oxygen gas. In this case, it may also be feasible that two or more columns, each of which is filled with the absorbing agent, are installed, and the absorbing time and the desorbing time in these columns are differentiated stagewise so as to enable the concentrated oxygen gas to be taken out continuously, as has been practised in the P.S.A. method. It should be noted that this method is just an example, and not so limitative.

In the next place, when the material for gas separation according to the present invention or its solution is used as the absorbing liquid, the liquid of the separator is filled in an absorbing column as the absorbing liquid. Subsequently, the oxygen-containing feed gas is introduced into the absorbing column so as to cause oxygen to be absorbed into the absorbing liquid. Then, the gas with reduced quantity of oxygen is discharged from the purging port of the column. Thereafter, the absorbing liquid which has absorbed oxygen thereinto is forwarded to a stripper column, where the concentrated oxygen gas as absorbed is let out of the absorbing liquid under a reduced pressure or under heat so as to be taken out of the column. On the other hand, the absorbing liquid which has let out oxygen is returned to the absorbing column where air, etc. is again introduced to absorb oxygen thereinto. These operations are repeated in succession. Depending on necessity, the absorbing column and the stripping column may be connected with various devices such as a compressor, an air blower, a fan, a vacuum pump, a pressure regulator, a flow meter, and a circulating pump. It should be noted that the above-described method is just an example and not so limitative.

Since the material for gas separation according to the present invention has high separating performance, if and when such separator is used, oxygen can be taken out at a high concentration irrespective of the mode of its use: that is to say, in case of the separator being used in the form of the selective gas permeating membrane; in case of its being used in the form of the selective gas absorbing agent; or any other form of use thereof. Moreover, the absorbing and desorbing speed of oxygen by the present separator is much higher than that of the conventional oxygen complex, hence oxygen can be concentrated with good efficiency. For example, it is possible to take out oxygen with the efficiency as high as 100% rate through one- or two-stage operation. On the other hand, when the feed gas is air, the remaining gas after separation of oxygen is one containing therein high concentration of nitrogen, hence this method is also worthy as the production method for highly concentrated nitrogen. Apart from this, the method is also useful for removing oxygen from a gas containing therein a very small amount of oxygen.

From what has been described in the foregoing, it may be understood that oxygen can be separated efficiently from air by use of the material for gas separation of the present invention. Since oxygen is the gas which is in wide use in every field of industry, the material for gas separation according to the present invention may accordingly be used in various fields such as, in particular, welding and cutting of steel material, blowing of oxygen into electric furnace, melting of glass, bleaching of pulp, treatment of sewage, processing of metals, paper manufacturing, aeronautic and space technology, prevention of public pollution and contamination, medical treatment, electronic industry, chemical industry, ocean development, and so forth. In addition, separation of nitrogen from the remaining gas after separation of oxygen from air would be useful as the inactive gas for use in the fields of electronic industry, food industry, iron and steel industry, metallurgical industry, chemical industry, medical treatment, and so forth. Further, the separator of the present invention is useful for sealing gas.

With a view to enabling those persons skilled in the art to put the present invention into practice, several preferred examples of the present invention will be described hereinbelow. It should however be understood that these examples are illustrative only and not so restrictive, and that any changes and modifications in the ingredients used for preparing the material for gas separation of the present invention as well as the operating conditions for separating particular gas from a feed may be made within the ambit of the invention as recited in the appended claims.

For the sake of ready reference, the gas permeation rate in these examples is measured in the following manner. That is to say, a flat film produced from polytrimethylvinylsilane is placed as the base film onto the surface of a cylindrical glass cell having an outer diameter of 45 mm; then, from the upper part of the cylindrical glass cell, a solution containing therein the material for gas separation to be tested is poured, after which a gas to be tested for its permeation is caused to pass through the separator solution, while it is being agitated; on the other hand, the lower part of the base film (the secondary side) was subjected to pressure-reduction to analyze by the gas chromatography a quantity of the gas which had passed through the film within a certain definite time, from which the permeation rate Q of the gas was found. Incidentally, it should be understood that the gas permeation rate Q in these examples is the value as measured at a temperature of 30° C., unless oterwise, specified, and that the unit of measurement thereof is "cm$^3$/cm$^2$ .sec. cmHg". Also, a reference letter $\alpha$ denotes a rate ratio ($Q_{O2}/Q_{N2}$) of oxygen to nitrogen.

Further, measurement of the gas absorbing quantity was done in the following manner. That is to say, a predetermined quantity of the material for gas separation or its solution was poured into a glass flask of a known volume, and then the interior of the container was subjected to pressure-reduction to purge air. After sufficient purging treatment, a gas to be measured was introduced into the flask, while maintaining the same at a temperature of 23° C., and the quantity of absorption was measured by a gas burette. The absorption quantity of the gas in its solution form was measured with the absorption quantity of the solvent used having been made a blank, by subtraction of which the net absorption quantity of the separator was found.

EXAMPLE 1

(a) Preparation of the separator 2.3 ml of dipropylenetriamine H+NH-CH$_2$CH$_2$CH$_2$)$_2$NH$_2$ and 0.95 g of cobaltous thiocyanate Co(SCN)$_2$ were put into a flask of a 50 ml volume, and the batch was stirred under a nitrogen atmosphere, whereupon reaction took place somewhat exothermically. After lapse of 15 min., 9 ml of dimethyl sulfoxide (hereinafter abbreviated as "DMSO") was added to the flask and the reaction was continued for two hours at 60° C., a homogeneous dark red solution was obtained.

(b) Measurement of the gas O$_2$ and N$_2$ permeabilities for the liquid membrane containing the separator 10 ml of the above mentioned separator was put in a cell for measuring the gas permeability. Into the primary side of the cell, air was caused to flow at the rate of 0.5 liter/min. Subsequently, a pressure at the secondary side of the cell was adjusted to 2 mmHg and the temperature for the measurement to 30° C. When the permeated gas was analyzed by the gas chromatography, it was found that the oxygen concentration was 62.3%. It was also found that the oxygen permeation rate ($Q_{O2}$) at this time was $4.0 \times 10^{-6}$, and the ratio of oxygen permeation rate to nitrogen permeation rate $\alpha$ (=$Q_{O2}/Q_{N2}$) was 5.2.

EXAMPLE 2

(a) Preparation of the separator

In the same manner as in (a) of Example 1, 2.3 ml of dipropylenetriamine and 0.95g of cobaltous thiocyanate were reacted, after which 2.2 ml of 1-methylimidazole was added to the reaction mixture and the reaction was continued for ten minutes. Thereafter, 7 ml of DMSO was added to the reaction mixture, and stirred for two hours at 60° C., a homogeneous dark red solution was obtained.

(b) Measurement of the gas permeation rate

In the same manner as in (b) of Example 1, the gas permeation test was conducted. It was found that the oxygen concentration in the permeated gas was 69.4%, the oxygen permeation rate ($Q_{O2}$) was $3.7 \times 10^{-6}$, and $O_2/N_2$ selectivity ($\alpha$) was 8.6. From this result of measurement, it can be seen that use of 1-methylimidazole as the axial base would increase the value of $\alpha$.

(c) Measurement of the gas absorption quantity 5 ml of the separator as prepared in the above mentioned (a) was put into a flask of a 25 ml volume. Oxygen was fed and the absorbed quantity of oxygen was measured by a gas burette. The actual quantity of absorption of oxygen was calculated by subtracting the oxygen absorption quantity for the mixed solution of DMSO and 1-methylimidazole (containing no cobalt compound). As the result, it was found that the oxygen absorption quantity was 41.2 ml, which value corresponded to 0.74 oxygen molecule per a cobalt atom. Further, after oxygen was desorbed from the separator under vacuum, 8 ml of oxygen was absorbed again. This shows that the separator absorb and desorb oxygen reversibly.

EXAMPLE 3

The same procedure as in (a) of Example 2 was carried out with the exception that 1.4 g of cobaltous acetate was used in place of cobaltous thiocyanate, from which a homogeneous dark reddish brown solution was obtained. The gas permeation performance of the separator was measured in the same manner as in (b) of Example 1. Oxygen concentration in the permeated gas was 38.5%, the oxygen permeation rate ($Q_{O2}$) was $1.4 \times 10^{-6}$ and $O_2/N_2$ selectivity ($\alpha$) was 2.6.

EXAMPLE 4

The same procedure as in (a) of Example 2 was carried out with the exception that 1.2 g of cobaltous bromide was used in place of cobaltous thiocyanate. The gas permeability of this substance was measured in the same manner as in (b) of Example 1, the oxygen concentration in the permeated gas was 39%, the oxygen permeation rate ($Q_{O2}$) was $3.3 \times 10^{-6}$ and $O_2/N_2$ selectivity ($\alpha$) was 2.6.

EXAMPLE 5

(a) Preparation of the separator 2.6 ml of tripropylenetetramine $H-(-NH-CH_2 CH_2CH_2)_3NH_2$ and 1.75 g of cobaltous thiocyanate were mixed by stirring in a flask of a 50 ml volume under nitrogen atmosphere, whereupon reaction took place somewhat exothermically. After lapse of 10 minutes, 20 ml of DMSO was added to the flask and the reaction was continued for two hours at 40° C., a homogeneous dark red solution was obtained.

(b) Measurement of the gas permeation rate 10 ml of the separetor above mentioned in (a) was put in a cell for measuring the gas permeation. In the similar manner as in (b) of Example 1, the gas permeation test was conducted. It was found that the oxygen concentration in the permeated gas was 50.1%. Also, the permeation rate of oxygen ($Q_{O2}$) was found to be $2.2 \times 10^{-6}$ and $O_2/N_2$ selectivity ($\alpha$) to be 3.8.

EXAMPLE 6

(a) Preparation of the separator

In the same manner as in Example 5, 2.6 ml of tripropylenetetramine and 1.75 g of cobaltous thiocyanate were reacted, after which 11.5 ml of 1-methylimidazole was added to the mixture and the reaction was continued for ten minutes. Thereafter, 10 ml of DMSO was added to the reaction mixture and it was stirred for two hours at 40° C., a homogeneous dark red solution was obtained.

(b) Measurement of the gas permeation rate

In the same manner as in (b) of Example 1, the gas permeation test was conducted. It was found that the oxygen concentration in the permeated gas was 84.1%, the oxygen permeation rate ($Q_{O2}$) was $7.9 \times 10^{-6}$, and $O_2/N_2$ selectivity ($\alpha$) was 20. From this result of measurement, it can be seen that the use of 1-methylimidazole as the axial base would considerably increase $Q_{O2}$ as well as (c) Measurement of the gas absorption quantity 5 ml of the separator as prepared in the above mentioned (a) was put into a glass flask of a 25 ml volume. The gas absorption test was conducted in the same manner as in (C) of Example 2. It was found that the oxygen absorption quantity was 47.9 ml, which value corresponded to 0.79 molecule of oxygen per a cobalt atom.

Further, after oxygen was desorbed from the separator under vacuum, 36.1 ml of oxygen was absorbed again. This shows that the separator reversibly absorbs and desorbs oxygen.

EXAMPLES 7 AND 8

The same procedure as in (a) of Example 6 was carried out with the exception that 2.5 g of cobaltous acetate and 3 ml of 1-methylimidazole were used in place of cobaltous thiocyanate a reddish purple solution was obtained. The gas permeation performance of the separator was measured in the same manner as in (b) of Example 1. The results of the measurement are as shown in Table 1, from which it will be seen that the selectivity of the separator depends on the oxygen concentration in the feed gas.

EXAMPLE 9

2.6 ml of tripropylenetetramine and 10 ml of toluene were put into a flask of a 50 ml volume, into which mixture 1.5 g of methyl iodide was dropped slowly under the nitrogen atmosphere, whereupon the mixture exhibited vigorous exothermic reaction to result in a methyl derivative of tripropylene tetramine which was insoluble in toluene. The reaction continued for two hours at 40° C. The volatile component was evaporated at 40° C. under vacuum, followed by further heating of the reaction product to 150° C., from which a waxy solid substance was obtained. Then, 10 g of cobaltous thiocyanate was added to this methyl derivative of tripropylene tetramine. After the reaction was continued for two hours at 50° C., 15 ml of DMSO and 2 ml of 1-methylimidazole were added, and the mixture was heated to 70° C. A dark red solution was obtained. The gas permeation performance of this substance is shown in Table 1, from which it will be seen that the selectivity of the separator improved remarkably by the use of methyl derivative of tripropylenetetramine.

EXAMPLE 10

(a) Preparation of the separator 0.9 g of tripropylenetetramine and 2 ml of chloroform were put into a flask of a 50 ml volume, into which mixture 9 ml of 0.35 mole/lit. chloroform solution of stearic anhydride was added under the nitrogen atmosphere, and the mixture was stirred for one hour at 60° C.

Susequently, volatile component was evaporated under vacuum from the reaction mixture at a room temperature and a white solid substance was obtained. When this solid substance was measured by a KBr disc for its infrared absorption spectrum, there could be observed an absorption peak due to the C=O bond in amide in the vicinity of 1660 cm$^{-1}$, from which formation of the stearic acid derivative of tripropylene tetramine was verified.

To the thus obtained solid substance, 0.9 g of cobaltous thiocyanate was added, and the mixture was subjected to react for 0.5 hour at 120° C. Subsequently, 1 ml of 1-methylimidazole was added and the reaction continued for one hour at 40° C. Further, 10 ml of DMSO was added to the reaction mixture and the reaction continued for two hours at the same temperature.

A viscous gel in purple color was obtained.

(b) Measurement of the gas absorption quantity 5 ml of the separator a prepared in the above mentioned (a) was sampled to measure its oxygen absorption quantity in the same manner as in (c) of Example 2, whereupon it indicated 8.9 ml. In the same manner, the nitrogen absorption quantity was also measured, which indicated 0.5 ml. It can therefore be seen that the selective absorption quantity of oxygen is indeed 18 times as large as that of nitrogen, and that, whenever the condition of $-(NH_2CH_2CH_2CH_2)_{\overline{n}}$ is satisfied, high selectivity can be exhibited even with oligomeric derivatives.

dioxide was mixed in feed gas (air) and caused to flow at the same flow rate as in the preceding example to thereby measure the gas permeation performance. The results of the measurement revealed that the oxygen concentration of the permeated gas was 91.8%, the oxygen permeation rate ($Q_{O2}$) was $1.3 \times 10^{-6}$, and $O_2/N_2$ selectivity ($\alpha$) was 37.9. From this results, it can be seen that mixing of carbon dioxide in feed gas would remarkably increase the value of $\alpha$.

EXAMPLE 13

Carbon dioxide gas introduced at room temperature into the separator as obtained in Example 11 for a period of ten minutes for contact therewith. After this procedure, the gas permeation performance was measured in the same manner as in (b) of Example 1. It was found that the oxygen concentration of the permeated gas was 76.8%, the oxygen permeation rate ($Q_{O2}$) was $2.6 \times 10^{-6}$, and $O_2/N_2$ selectivity ($\alpha$) was 12.6. From the result, it can be seen that the contact treatment of the separator with carbon dioxide would particularly improves $O_2/N_2$ selectivity of the separator.

EXAMPLE 14

The exactly same procedure as in Example 11 was carried our with the exception that 4.2 ml of dipropylenetriamine was used in place of tripropylenetetramine a homogeneous dark red solution was obtained. Using this separator, the gas permeation performance thereof was measured in the same manner as in (b) of Example 1. The results of measurement are as shown in Table 2, from which it can be seen that the value of $\alpha$

TABLE 1

| | GAS PERMEATION TEST | | | | |
|---|---|---|---|---|---|
| | Composition of Feed Gas Oxygen Concentration (%) (#) | Composition of Permeated Gas Oxygen Concentration (%) | Pressure at Secondary Side (mm Hg) | $Q_{O2} \times 10^3$ (cc/cm$^3$ · sec · cm Hg) | $\alpha$ |
| Example 7 | 20.9 | 32.3 | 2 | 160 | 1.8 |
| Example 8 | 50.0 | 59.5 | 2 | 110 | 1.5 |
| Example 9 | 20.9 | 90.0 | 1 | 57 | 34 |

(#) oxygen concentration = $[O_2/(N_2 + O_2)] \times 100$ (%)

EXAMPLE 11

(a) Preparation of the separator 2.6 ml of tripropylenetetramine and 1.75 g of cobaltous thiocyanate were put into a flask having a 50 ml volume, and the mixture was stirred under a nitrogen atmosphere, whereupon reaction took place somewhat exothermically. After lapse of ten minutes, 3.9 ml of 1-methylimidazole was added to the reaction mixture to continue the reaction for ten minutes, after which 10 ml of DMSO was added and the reaction mixture was agitated for two hours at 40° C., from which a dark red solution was obtained.

(b) Measurement of the gas permeation rate 10 ml of the separator as prepared at the above mentioned (a) was put into a cell for measuring the gas permeability. The gas permeation test was conducted in the same manner as in (b) of Example 1. It was found that the oxygen concentration was 60.8%, the oxygen permeation rate ($Q_{O2}$) was $2.3 \times 10^{-6}$, and $O_2/N_2$ selectivity ($\alpha$) was 5.9.

EXAMPLE 12

After measurement of the gas permeation performance as in (b) of Example 11, 10 vol % of carbon has improved by mixing of carbon dioxide to feed gas.

EXAMPLE 15

The exactly same procedure as in (a) of Example 11 was carried out with the exception that 1.3 g of cobaltous chloride was used in place of cobaltous thiocyanate, whereupon a homogeneous dark red solution was obtained. The gas permeation performance of this separator was measured in the same manner as in (b) of Example 1, the results as shown in Table 2 was obtained.

EXAMPLE 16

The exactly same procedure as in Example 11 was carried out with the exception that 6 g of 4-dimethylaminopyridine was used in place of 1-methylimidazole, whereupon a dark red solution was obtained at 40° C. The gas permeation performance of this separator was evaluated in the same manner as in (b) of Example 1 with the exception that a gas mixture prepared from pure oxygen and pure nitrogen was used as the feed gas. The results of the measurement are as shown in Table 2. It can be seen that the oxygen permeation rate ($Q_{O2}$) and the $O_2/N_2$ selectivity ($\alpha$) are both low compared with the system (Example 17) not containing carbon dioxide.

EXAMPLE 17

The exactly same procedure as in Example 16 was carried out with the exception that the gas mixture containing 10 vol % of carbon dioxide in air was used as the feed gas. The results as shown in Table 2 were obtained, from which it can be seen that not only the $O_2/N_2$ selectivity ($\alpha$), but also the oxygen permeation rate ($Q_{O2}$) were remarkably increased due to carbon dioxide in the air.

EXAMPLE 18

The exactly same procedure as in Example 11 was carried out with the exception that 7.5 g of ethyl benzoate was used in place of 1-methylimidazole, whereupon a dark reddish brown solution was obtained. Using this separator, the gas permeation performance thereof was measured with the results as shown in Table 2. It shows that mixing of carbon dioxide would remarkably increase the value of $\alpha$.

TABLE 2

| | | GAS PERMEATION TEST | | | | |
|---|---|---|---|---|---|---|
| | Carbon Dioxide (#1) | Composition of Measuring Gas (Oxygen Concentration (%)) (#2) | Composition of Permeated Gas (Oxygen Concentration (%)) (#2) | Pressure at Secondary Side (mm Hg) | $Q_{O2} \times 10^8$ (cc/cm$^2$ · sec · cm Hg) | $\alpha$ |
| Example 14 | air | 20.9 | 69.4 | 2 | 370 | 8.6 |
| | O | | 81.3 | | 98 | 16.6 |
| Example 15 | air | 20.9 | 58.4 | 2 | 170 | 5.3 |
| | O | | 62.8 | | 140 | 6.4 |
| Example 16 | — | 21.9 | 41.2 | 2 | 72 | 2.5 |
| Example 17 | air | 20.9 | 83.9 | 1.5 | 218 | 19.6 |
| | O | | 86.5 | | 241 | 24.1 |
| Example 18 | air | 20.9 | 65.1 | 2 | 600 | 7.1 |
| | O | | 90.6 | | 310 | 36.5 |

NOTE:
(#1) The mark O indicates the gas permeation performance when 10% of carbon dioxide gas is mixed with respect to the feed gas.
(#2) Oxygen concentration = [$O_2/(N_2 + O_2)$] × 100%)

What is claimed is:

1. A material for oxygen separation consisting essentially of:
   (A) a cobalt compound; and
   (B) amine compound or its derivatives containing therein a unit structure to be represented by the following general formula:

$$-(NHCH_2CH_2)_n-$$

where n is an integer of 2 or more, said components being brought into mutual contact to form a complex which is capable of absorbing and desorbing oxygen.

2. A material for oxygen seapration according to claim 1, wherein an axial base is brought into contact with said components (A) and (B), either simultaneously with contact between said components (A) and (B) or subsequent to the contact between them.

3. A material for oxygen separation according to claim 2, wherein the contact between said components (A), (B) and the axial base is carried out in the presence of a non-aqueous solvent.

4. A material for oxygen separation according to claim 1, wherein the contact between said components (A) and (B) is carried out in the presence of a non-aqueous solvent.

5. A material for oxygen separation according to claim 1, 12, 3, 4 wherein carbon dioxide as a component (C) is brought into contact with said material for oxygen separation, either simultaneously with, or subsequent to, formation of the complex.

* * * * *